March 7, 1961 F. W. LINDBLOM 2,973,690
SPECTACLE BRIDGE CONSTRUCTION
Filed Sept. 26, 1957
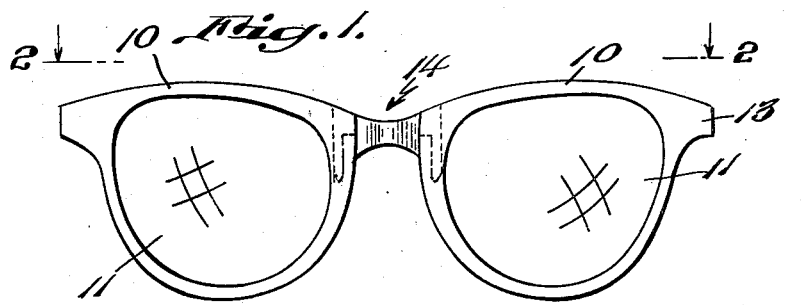
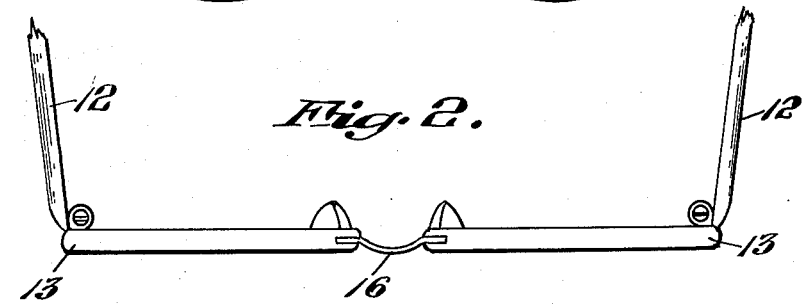
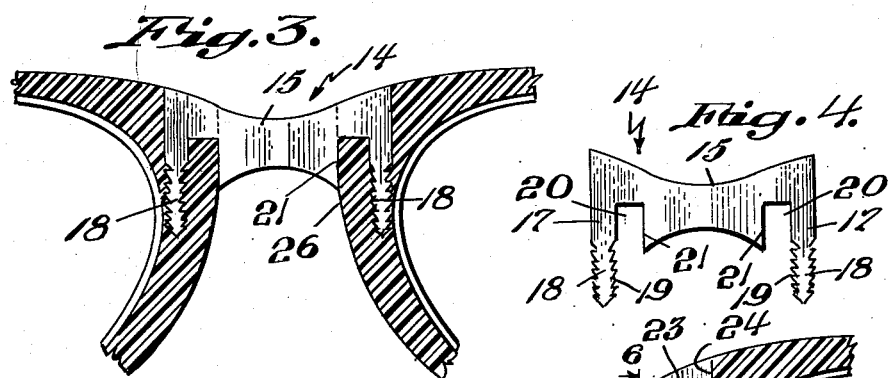
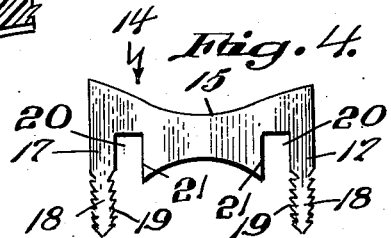
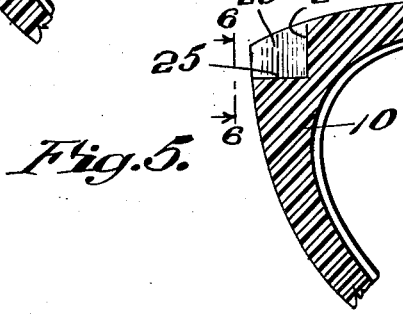
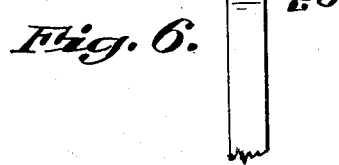
INVENTOR.
Frank W. Lindblom
BY
Barlow & Barlow
ATTORNEYS.

United States Patent Office 2,973,690
Patented Mar. 7, 1961

2,973,690

SPECTACLE BRIDGE CONSTRUCTION

Frank W. Lindblom, Warwick, R.I., assignor to Welsh Manufacturing Company, a corporation of Rhode Island Filed Sept. 26, 1957, Ser. No. 686,370

1 Claim. (Cl. 88—43)

This invention relates to an ophthalmic mounting in which lens rims are assembled by means of a bridge which extends between them.

In the usual ophthalmic mounting where there are non-metallic lens rims assembled by means of a metal bridge which extended between two lenses, rivets or screws are provided to attach the two parts together.

One of the objects of this invention is to provide a bridge construction which may be assembled with the lens rims without the use of rivets or screws.

Another object of this invention is to provide for assembling lens rims and a bridge in a less expensive manner than heretofore.

Another object in this invention is to provide an assembly in which the parts may be forced together by pressure and without the use of heat.

Another object of this invention is to provide an assembly which will be sufficiently rigid so that the bridge will not rock or pivot with reference to either of the lenses nor will the lenses rock or pivot with reference to each other.

With these and other objects in view, the invention consists of certain novel features of construction as will be more fully described and particularly pointed out in the appended claim.

In the accompanying drawings:

Figure 1 is an elevation of a spectacle incorporating this invention.

Figure 2 is a top plan view thereof.

Figure 3 is a fragmental sectional view of the rims and illustrating the bridge as connecting these rims.

Figure 4 is an elevation of the bridge alone.

Figure 5 is a fragmental view of a portion of the rim along its nasal edge.

Figure 6 is an edge view on line 6—6 of Figure 5.

In proceeding with this invention I slot the upper non-metallic rims of the lenses at their nasal edges and provide a bridge which will enter these slots with a spur which will extend from the bridge at the location where the bridge enters the slot so that the spur may enter into the non-metallic rims of the lenses and become embedded therein so as to act as a fastening for securing the bridge to the rims. At a position adjacent nasal edges of the rims the bridge extends to provide a shoulder to engage this outer surface of the lens rim to additionally provide a support to prevent the rims from rocking one with reference to the other or either with reference to the bridge.

With reference to the drawings, 10 designates the lens rims which are formed of a non-metallic material such as celluloid or similar material each of which completely surrounds the lens 11, although encirclement is not necessary. Temples 12 are hinged to the lugs 13 at the outer edges of the rims.

A bridge designated generally 14 is of metal and connects the non-metallic rims together. This bridge is formed of sheet metal having a main body portion 15 which is forwardly curved or arcuate as at 16 as shown in Figure 2. Located at either edge of this body portion 15 there are provided arms 17 which terminate in spurs 18 extending downwardly from the body and which are barbed at their opposite edges as at 19. These arms 17 are formed by a recess 20 between the body and the arms which form shoulder 21 for a purpose to be hereinafter explained.

The inner or nasal edge of the rims 10 are slotted as at 22 at their upper edges forming a recess 23 (see Figure 5) in each having right angularly extending edges 24 and 25.

In assembling the bridge and rims each spur 18 engages the surface 25 of the slotted recess with its outer edge engaging the surface 24 of the recess and then both are forced by pressure and without the use of any heat so that the spurs of the bridge will enter into the stock of the rim and become embedded therein as shown in Figure 3. At the same time the space between the outer edge of the arms 17 and the shoulder 21 is such that this shoulder 21 will extend along the inner nasal edge 26 of each of the rims and engage this surface so as to provide a steadying factor to prevent rocking or wobbling of the rims with reference to each other or with reference to the bridge.

I claim:

An ophthalmic mounting comprising lens rims having non-metallic upper portions with slots in generally the plane of the lenses at their nasal edges and a metallic bridge between said rims with its opposite edge portions in said slots, said bridge having a central portion extending downwardly beyond said slots and provided with substantially parallel edges engaging the edges of the inner nasal edges of the lens rims and spurs on said bridge extending downwardly and into the rims and spaced outwardly from said central portion and each substantially parallel to an adjacent edge of said central portion to co-act therewith and bind a portion of said rim between the rim and spur to prevent movement of the rims relative to bridge in substantially the plane of the lens rims.

References Cited in the file of this patent

UNITED STATES PATENTS

| | | |
|---|---|---|
| 1,687,960 | Welsh | Oct. 16, 1928 |
| 1,718,986 | Searles | July 2, 1929 |
| 1,750,987 | Beatty | Mar. 18, 1930 |
| 1,781,760 | Marciano | Nov. 18, 1930 |
| 1,838,775 | Marciano | Dec. 29, 1931 |
| 1,924,951 | Marciano | Aug. 29, 1933 |
| 1,987,206 | Nerney | Jan. 8, 1935 |